(12) United States Patent
Kotake et al.

(10) Patent No.: US 12,117,187 B2
(45) Date of Patent: Oct. 15, 2024

(54) OUTDOOR UNIT, AIR-CONDITIONING SYSTEM, AND RECORDING MEDIUM

(71) Applicant: Mitsubishi Electric Corporation, Tokyo (JP)

(72) Inventors: Hiroaki Kotake, Tokyo (JP); Hiroaki Endo, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 456 days.

(21) Appl. No.: 17/639,212

(22) PCT Filed: Nov. 12, 2019

(86) PCT No.: PCT/JP2019/044381
§ 371 (c)(1),
(2) Date: Feb. 28, 2022

(87) PCT Pub. No.: WO2021/095125
PCT Pub. Date: May 20, 2021

(65) Prior Publication Data
US 2022/0333793 A1    Oct. 20, 2022

(51) Int. Cl.
*F24F 1/20* (2011.01)
*H04L 61/50* (2022.01)

(52) U.S. Cl.
CPC .............. *F24F 1/20* (2013.01); *H04L 61/50* (2022.05)

(58) Field of Classification Search
CPC .... F24F 11/54; F24F 11/64; F24F 1/20; F24F 11/30; F24F 11/56; F24F 11/88; H04L 61/50

(Continued)

(56) References Cited

U.S. PATENT DOCUMENTS

| 5,853,123 A | 12/1998 | Okano et al. |
| 8,781,634 B2 | 7/2014 | Kim et al. |

(Continued)

FOREIGN PATENT DOCUMENTS

| EP | 0783091 B1 | 3/2004 |
| EP | 3327364 A1 | 5/2018 |

(Continued)

OTHER PUBLICATIONS

International Search Report of the International Searching Authority mailed Feb. 4, 2020 issued in the corresponding International Application No. PCT/JP2019/044381 (and English translation).

(Continued)

*Primary Examiner* — Chun Cao
(74) *Attorney, Agent, or Firm* — Posz Law Group, PLC

(57) ABSTRACT

An outdoor unit includes a group information manager that manages group information relating to a group corresponding to the outdoor unit, the group information being set by a user, a group information transmitter that transmits the group information to a management device, a transfer destination address manager that manages, as a transfer destination address, an address of another outdoor unit that corresponds to a same group as the group corresponding the outdoor unit, the address being received from the management device, a command transferer that transfers, when a destination of a received first operation command is not any of indoor units connected to the outdoor unit, the first operation command to another outdoor unit indicated by a transfer destination address, and transfers, when a destination of a received second operation command is any of the indoor units connected to the outdoor unit, the second operation command to the indoor unit.

7 Claims, 7 Drawing Sheets

(58) Field of Classification Search
USPC .......................................................... 700/276
See application file for complete search history.

(56) References Cited

U.S. PATENT DOCUMENTS

| | | | | |
|---|---|---|---|---|
| 2004/0204793 | A1* | 10/2004 | Yoon | F24F 11/62 |
| | | | | 700/277 |
| 2006/0123811 | A1* | 6/2006 | Ha | F24F 11/62 |
| | | | | 62/175 |
| 2007/0091990 | A1* | 4/2007 | Smith | H04M 11/066 |
| | | | | 375/222 |
| 2009/0151382 | A1 | 6/2009 | Okano et al. | |
| 2011/0308263 | A1 | 12/2011 | Matsui et al. | |
| 2014/0184418 | A1* | 7/2014 | Maeda | F24F 11/63 |
| | | | | 340/691.6 |
| 2015/0276252 | A1 | 10/2015 | Iida | |
| 2016/0265799 | A1* | 9/2016 | Matsuno | F24F 11/56 |
| 2018/0202682 | A1 | 7/2018 | Park et al. | |
| 2020/0041151 | A1* | 2/2020 | Tatei | F24F 11/56 |
| 2020/0133219 | A1 | 4/2020 | Ishizaka | |
| 2021/0182050 | A1* | 6/2021 | Tsuji | F24F 11/64 |

FOREIGN PATENT DOCUMENTS

| | | |
|---|---|---|
| JP | 07-091719 A | 4/1995 |
| JP | H07-174396 A | 7/1995 |
| JP | 2003-322389 A | 11/2003 |
| JP | 4165581 B2 | 10/2008 |
| JP | 4380738 B2 | 12/2009 |
| JP | 2011-163732 A | 8/2011 |
| JP | 2012-167827 A | 9/2012 |
| JP | 5452777 B1 | 3/2014 |
| WO | 2018/229814 A1 | 12/2018 |
| WO | 2019/038827 A1 | 2/2019 |
| WO | 2019/186619 A1 | 10/2019 |

OTHER PUBLICATIONS

Office Action dated Jun. 20, 2023, issued for the corresponding JP patent application No. 2021-555661 (and English Translation).
Extended European Search Report dated Dec. 13, 2022 issued in corresponding EP Patent Application No. 19952146.9.
Office Action dated Jan. 10, 2023 issued in corresponding JP Patent Application No. 2021-555661 (and English translation).

* cited by examiner

OUTDOOR UNIT, AIR-CONDITIONING SYSTEM, AND RECORDING MEDIUM

CROSS REFERENCE TO RELATED APPLICATION

This application is a U.S. national stage application of International Patent Application No. PCT/JP2019/044381 filed on Nov. 12, 2019, the disclosure of which is incorporated herein by reference.

TECHNICAL FIELD

The present disclosure relates to an outdoor unit, an air-conditioning system, and a program.

BACKGROUND

A multi-air-conditioning system for a building has generally used the same dedicated communication method in communication on an integrated transmission line, that is, communication between a centralized management device and each outdoor unit and communication among outdoor units, and communication on an internal/external transmission line, that is, communication among indoor units, outdoor units, and remote controllers.

The dedicated communication method, however, has problems in that system scalability is poor since the number of units to be connected and communication speed are limited in the integrated transmission line, and connection to a general-purpose local area network (LAN) is difficult.

In contrast, Patent Literature 1 discloses a technique of building an integrated transmission line in the general-purpose LAN.

PATENT LITERATURE

Patent Literature 1: Japanese Patent No. 4165581

In the multi-air-conditioning system for a building, it is not uncommon that, in a group operation for operating one or more indoor units together, indoor units in different refrigerant systems belong to the same group. However, in a case where the integrated transmission line and the internal/external transmission line have different types of communication as in the technique disclosed in Patent Literature 1, significant suggestions have yet to be provided about how to implement the group operation of the group to which the indoor units in different refrigerant systems belong.

SUMMARY

The present disclosure is made in consideration of the above circumstances, and thus an objective of the present disclosure is to provide an outdoor unit and the like, while having system scalability, enabling a group operation of a group to which outdoor units having different refrigerant systems belong.

To achieve the above objective, an outdoor unit according to the present disclosure includes
   first communication means for communicating with a management device and one or more other outdoor units in a first communication method;
   second communication means for communicating with one or more indoor units and a remote controller in a second communication method different from the first communication method, the one or more indoor units and the remote controller being connected to the outdoor unit;
   first storage means for storing group information relating to a group corresponding to the outdoor unit, the group information being set by a user;
   group information notification means for notifying the management device of the set group information;
   second storage means for storing address information relating to an address of another outdoor unit among the one or more other outdoor units that corresponds to a same group as the group corresponding to the outdoor unit, the address information being received from the management device; and
   transfer means for transferring
      a first operation command received from the remote controller to the another outdoor unit when an indoor unit addressed in the first operation command is not included in the one or more indoor units, and
      a second operation command received from the another outdoor unit and addressed to an indoor unit of the one or more indoor units to the indoor unit.

The present disclosure enables, while having system scalability, a group operation of a group to which indoor units having different refrigerant systems belong.

DETAILED DESCRIPTION

Embodiments of the present disclosure are hereinafter described in detail with reference to the drawings.

Embodiment 1

Figure 1:
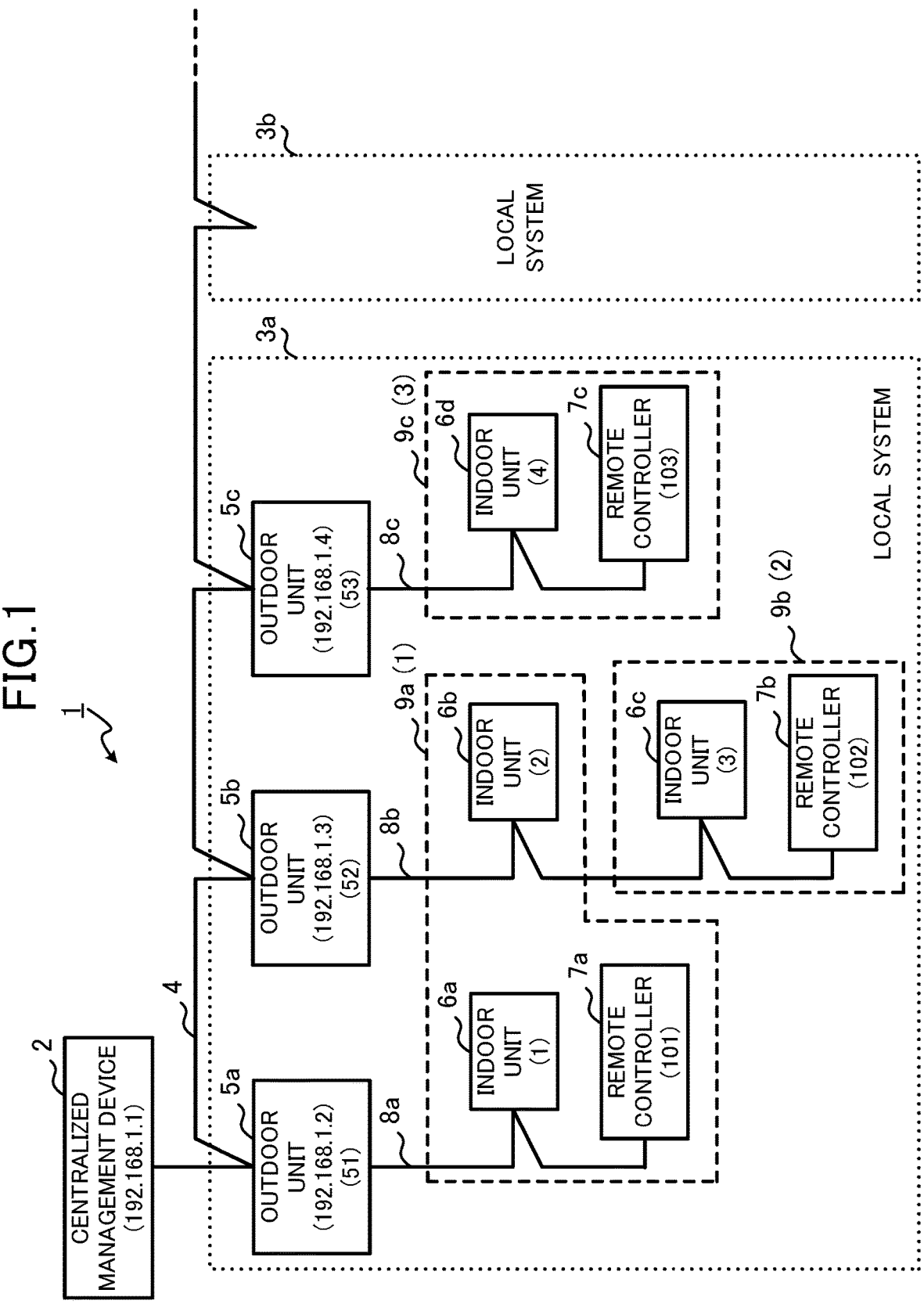
FIG. 1 is a diagram illustrating an overall configuration of an air-conditioning system according to Embodiment 1.

FIG. 1 is a diagram illustrating an overall configuration of an air-conditioning system 1 according to Embodiment 1 of the present disclosure. The air-conditioning system 1 is a multi-air-conditioning system for a building that performs air conditioning of a building, such as an office building. The air-conditioning system 1 includes a centralized management device 2 and local systems 3 (3a, 3b, . . . ).

Figure 2:
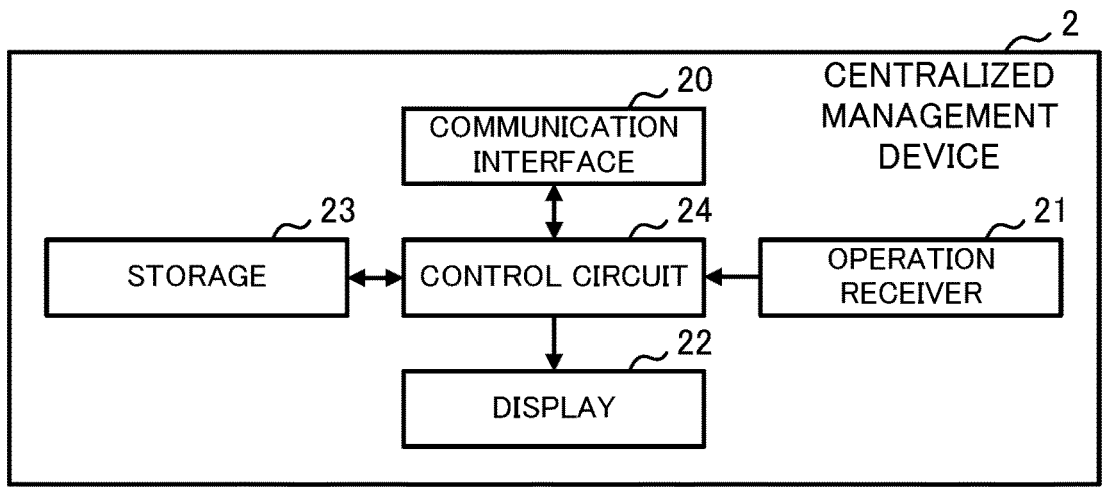
FIG. 2 is a block diagram illustrating a hardware configuration of a centralized management device of Embodiment 1.

The centralized management device 2 is an example of a management device according to the present disclosure, and a device for centralized management of each local system 3. The centralized management device 2 is installed at a place that only authorized person can enter, such as a management room in the building or the like. As illustrated in FIG. 2, the centralized management device 2 includes a communication interface 20, an operation receiver 21, a display 22, a secondary storage 23, and a control circuit 24.

The communication interface 20 is an interface for communication with each of the outdoor units (for example, in a case of the local system 3a, outdoor units 5a to 5c) included in each local system 3 via a transmission line 4 in a first communication method. As illustrated in FIG. 1, the centralized management device 2 is connected to each outdoor unit of each local system 3 in a daisy-chain fashion via the transmission line 4 that is a so-called integrated transmission line. The first communication method is, for example, Ethernet (registered trademark).

The centralized management device 2 is assigned a unique address for communication in the first communication method. The address for communication in the first communication method is hereinafter referred to as a first address. In the present embodiment, the centralized management device 2 is assigned, as the first address, "192.168.1.1", which is an Internet Protocol (IP) address.

The operation receiver 21 includes one or more input devices, for example, a keyboard, a mouse, a keypad, a push button, a touch panel, a touch pad, and the like. The operation receiver 21 receives an input operation from a user and sends a signal relating to the input operation to the control circuit 24.

The display 22 includes a display device, for example, a cathode-ray tube (CRT) display, a liquid crystal display, an organic electroluminescent (EL) display, a plasma display, and the like. The display 22 displays, under control of the control circuit 24, a screen for management of each local system 3.

The storage 23 includes a readable and writable nonvolatile semiconductor memory, for example, an electrically erasable programmable read-only memory (EEPROM), a flash memory, and the like, and a hard disk drive (HDD) and the like. The storage 23 stores a management program for management of each local system 3 and data for use in execution of the management program.

The control circuit 24 includes a central processing unit (CPU), a read only memory (ROM), a random access memory (RAM), and the like, and the control circuit 24 performs overall control over the centralized management device 2. Functions of the control circuit 24 are described in detail later.

Each local system 3 includes the outdoor units, one or more indoor units connected to each outdoor unit, and the remote controllers. Since technical features of each local system 3 have in common, the description of the local system 3a is used for description of each local system 3.

As illustrated in FIG. 1, the local system 3a includes outdoor units 5a to 5c, indoor units 6a to 6d, and remote controllers 7a to 7c. The outdoor unit 5a, the indoor unit 6a, and the remote controller 7a are bus-connected to a transmission line 8a. The outdoor unit 5a is connected to the indoor unit 6a via non-illustrated refrigerant piping for refrigerant circulation. That is, the outdoor unit 5a and the indoor unit 6a constitute a single refrigerant system.

An outdoor unit 5b, indoor units 6b and 6c, and a remote controller 7b are bus-connected to a transmission line 8b. The outdoor unit 5b is connected to the indoor units 6b and 6c via refrigerant piping different from the above-mentioned refrigerant piping passing between the outdoor unit 5a and the indoor unit 6a. That is, the outdoor unit 5b and the indoor units 6b and 6c constitute a single refrigerant system.

An outdoor unit 5c, an indoor unit 6d, and a remote controller 7c are bus-connected to a transmission line 8c. The outdoor unit 5c is connected to the indoor unit 6d via refrigerant piping different from any of the above-mentioned refrigerant piping passing between the outdoor unit 5a and the indoor unit 6a and the above-mentioned refrigerant piping passing through the outdoor unit 5b and the indoor units 6b and 6c. That is the outdoor unit 5c and the indoor unit 6d constitute a single refrigerant system.

Hereinafter, the outdoor units 5a to 5c are denoted as an outdoor unit 5 without being specifying individually in the description having in common the outdoor units 5a to 5c, the indoor unit 6a to 6d are denoted as an indoor unit 6 without being specifying individually in the description having in common the indoor unit 6a to 6d, the remote controllers 7a to 7c are denoted as a remote controller 7 without being specifying individually in the description having in common the remote controllers 7a to 7c, and the transmission lines 8a to 8c are denoted as a transmission line 8 without being specified individually in the description having in common the transmission lines 8a to 8c.

Figure 3:
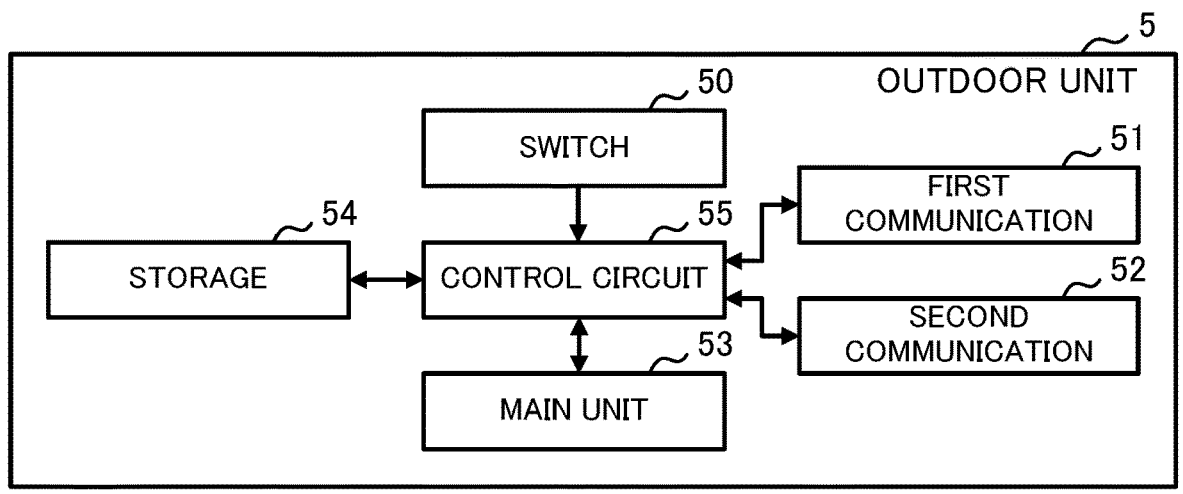
FIG. 3 is a block diagram illustrating a hardware configuration of an outdoor unit of Embodiment 1.

The outdoor unit 5 is an example of an outdoor unit according to the present disclosure. As illustrated in FIG. 3, the outdoor unit 5 includes a switch 50, a first communication interface 51, a second communication interface 52, a main unit 53, and a storage 54, and a control circuit 55. The switch 50 is an example of group information setting information receiving means according to the present disclosure. The switch 50 is, for example, a dip switch, and receives settings of later-described group information from a user.

The first communication interface 51 is an example of first communication means according to the present disclosure. The first communication interface 51 is an interface for communication with the centralized management device 2 and each outdoor unit 5 via the transmission line 4 in the above-mentioned first communication method. The outdoor unit 5 is assigned the afore-mentioned first address. As illustrated in FIG. 1, in the present embodiment, as the first address, the outdoor unit 5a is assigned "192.168.1.2", and the outdoor unit 5b is assigned "192.168.1.3", and the outdoor unit 5c is assigned "192.168.1.4".

The second communication interface 52 is an example of second communication means according to the present disclosure. The second communication interface 52 is an interface for communication with each indoor unit 6 and the remote controller 7 that are connected to the outdoor unit 5, in a second communication method via the transmission line 8 that is a so-called internal/external transmission line. As the second communication method, for example, 9600 bps asynchronous baseband transmission is adopted.

The outdoor unit 5 is assigned with a unique address for communication in the second communication method within the same local system 3. The address for communication in the second communication method is hereinafter referred to as a second address. As illustrated in FIG. 1, in the present embodiment, as the second address, the outdoor unit 5a is assigned "51", the outdoor unit 5b is assigned "52", and the outdoor unit 5c is assigned "53". The second address may be used redundantly in another local system 3 since the second address is assigned for each local system 3.

The main unit 53 is a component for implementing intrinsic features of general outdoor units, and includes, for example, a compressor, a heat exchanger, an expansion valve, and a four-way valve.

The storage 54 is an example of first storage means and second storage means according to the present disclosure. The storage 54 includes a readable and writable non-volatile semiconductor memory, for example, an EEPROM, a flash memory, and the like. The storage 54 stores a group-operation-related program (hereinafter referred to as a group operation program) and data for use in execution of the group operation program. In addition, the storage 54 further stores various kinds of programs including a program relating to operation control for the main unit 53 and data for use in execution of these programs.

The control circuit 55 includes a CPU, a ROM, a RAM, and the like (neither of which is illustrated), and performs overall control over the outdoor unit 5.

Figure 4:
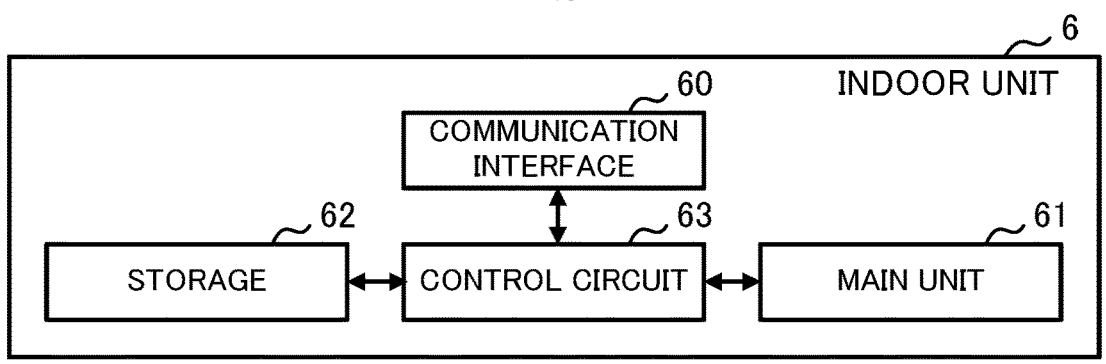
FIG. 4 is a block diagram illustrating a hardware configuration of an indoor unit of Embodiment 1.

The indoor unit 3 includes, as illustrated in FIG. 4, a communication interface 60, a main unit 61, a storage 62, and a control circuit 63. The communication interface 60 is an interface for communication with the outdoor unit 5, another indoor unit 6 (in a case where there is a plurality of indoor units 6 in the refrigerant system), and the remote controller 7 via the transmission line 8 in the second communication method.

The indoor unit 6 is assigned the second address. As illustrated in FIG. 1, in the present embodiment, as the second address, the indoor unit 6a is assigned "1", the indoor unit 6b is assigned "2", the indoor unit 6c is assigned "3", and the indoor unit 6d is as signed "4".

The main unit 61 is a component for implementing intrinsic features of general indoor units, and includes, for example, a fan, a heat exchanger, a temperature sensor.

The storage 62 includes a readable and writable non-volatile semiconductor memory, for example, an EEPROM, a flash memory, and the like. The storage 62 stores a program relating to operation control for the main unit 61, various kinds of programs including a program relating to communication control and the like, and data for use in execution of these programs.

The control circuit 63 includes a CPU, a ROM, and a RAM (neither of which is illustrated), and performs overall control of the indoor unit 6.

Figure 5:
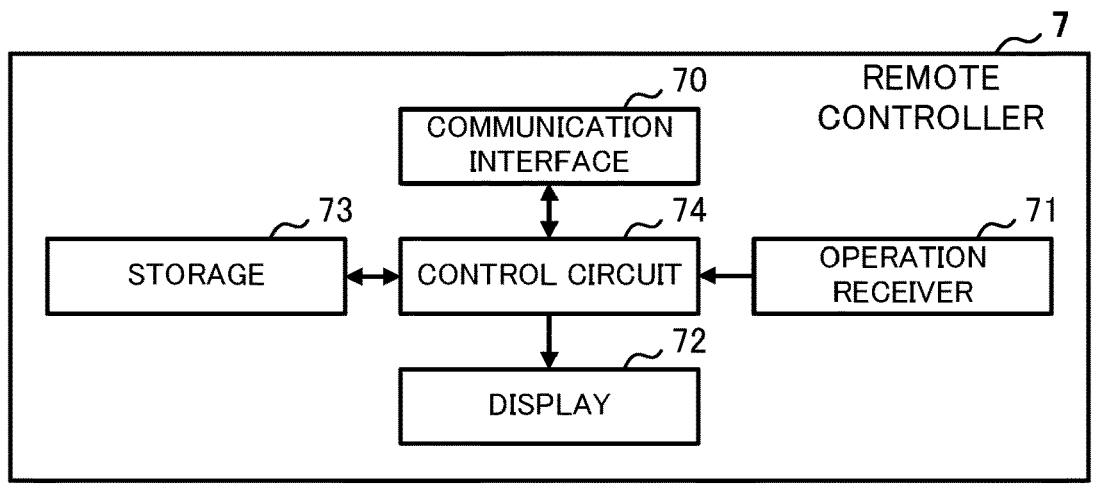
FIG. 5 is a block diagram illustrating a hardware configuration of a remote controller of Embodiment 1.

The remote controller 7 is a user interface for receiving an air-conditioning-related operation from a user, and includes, as illustrated in FIG. 5, a communication interface 70, an operation receiver 71, a display 72, a storage 73, and a control circuit 74.

The communication interface 70 is an interface for communication with the outdoor unit 5 and each indoor unit 6 via the transmission line 8 in the second communication method. The remote controller 7 is assigned the second address. As illustrated in FIG. 1, in the present embodiment, as the second address, the remote controller 7a is assigned "101", the remote controller 7b is assigned "102", and the remote controller 7c is assigned "103".

The operation receiver 71 includes one or more input devices, for example, a push button, a touch panel, a touch pad, and the like, and receives input operation from a user and sends to the control circuit 74 a signal relating to the received input operation.

The display 72 includes a display device, such as, for example, a liquid crystal display and an organic EL display. The display 72 displays various kinds of screens under control of the control circuit 74. Examples of screens displayed by the display 72 include a group setting screen for receiving operation relating to a group setting of the indoor unit 6 from a user, an air-conditioning operation screen for receiving operation relating to air conditioning from a user, and the like. Examples of the operation relating to the air conditioning include switching of start/stop operation, switching of operation modes, such as cooling, heating, dehumidification, ventilation, and the like, change of setting temperature, setting humidity, air volume, and the like.

The storage 73 includes a readable and writable non-volatile semiconductor memory, for example, an EEPROM, a flash memory, and the like. The storage 73 stores various kinds of programs including a program relating to a user interface, a program relating to communication control, and the like, and data for use in execution of these programs.

The control circuit 74 includes a CPU, a ROM, and a RAM (none of which is illustrated), and performs overall control over the remote controller 7. An installer, an administrator, or another user performs, as initial setting, group setting for grouping one or more indoor units 6 to be operated with the remote controller 7. Upon performing of the operation (for example, change of the setting temperature) relating to the air conditioning via the remote controller 7 after the group setting is performed, a frame (hereinafter referred to as an operation command) based on the operation is transmitted to each indoor unit 6 grouped by the remote controller 7, and each indoor unit 6 performs operation based on the received operation command.

As illustrated in FIG. 1, in the present embodiment, the indoor unit 6a and the indoor unit 6b are grouped as an operation target of the remote controller 7a, the indoor unit 6c is grouped as an operation target of the remote controller 7b, and the indoor unit 6d is grouped as an operation target of the remote controller 7c. Hereinafter, the group to which the indoor unit 6a and the indoor unit 6b belong is referred to as a group 9a, the group to which the indoor unit 6c belongs is referred to as a group 9b, and the group to which the indoor unit 6d belongs is referred to as a group 9c.

In a case where the group setting is performed in the same local system 3, the group setting can achieve, as in the group 9a, not only grouping of the indoor unit 6 connected via the transmission line 8 to the remote controller 7, but also grouping of another indoor unit 6 in a refrigerant system different from that of the indoor unit 6 into the same group.

Figure 6:
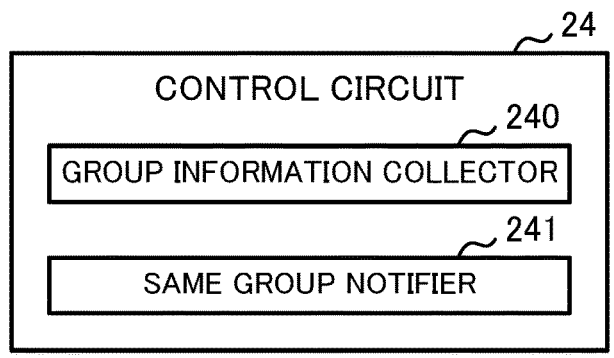
FIG. 6 is a diagram illustrating a functional configuration of a control circuit included in the centralized management device of Embodiment 1.

Next, functions of the control circuit 24 included in the centralized management device 2 are described in detail. The control circuit 24 functionally includes a group information collector 240 and a same group notifier 241, as illustrated in FIG. 6. These functional components are achieved by the CPU of the control circuit 24 executing the above-mentioned management programs stored in the storage 23.

The group information collector 240 collects, from each outdoor unit 5, group information corresponding to each outdoor unit 5. Specifically, the group information collector 240 sends to each outdoor unit 5 a frame (hereinafter referred to as a query frame) for querying of the group information periodically or upon a user performing of operation previously determined via the operation receiver 21. The group information collector 240 receives the group information transmitted by each outdoor unit 5 in response to the query frame, and saves, in the storage 23, the received group information in association with the first address of the outdoor unit 5.

The group information is information uniquely assigned by the user, for each group for which the group setting is performed by using the remote controllers 7a to 7c, and in the present embodiment, the group information is a number.

As illustrated in FIG. 1, the group information of the group 9a is "1", the group information of the group 9b is "2", and the group information of the group 9c is "3". The user operates the switch 50 of each outdoor unit 5 to set the group information corresponding to the outdoor unit 5. In the present embodiment, the user sets, as the corresponding group information, the group information of the outdoor unit 5a to "1", sets, as the corresponding group information, the group information of the outdoor unit 5b to "1" and "2", and sets, as the corresponding group information, the group information of the outdoor unit 5c to "3". That is, the user sets, relative to the outdoor unit 5, the group information of the group to which the indoor unit 6 connected to the outdoor unit 5 belongs.

The same group notifier 241 checks the group information set in each outdoor unit 5 and determines whether there is a plurality of outdoor units 5 to which the same group information is set. When there is the plurality of outdoor units 5 to which the same group information is set, the same group notifier 241 notifies each of the outdoor units 5 of the first address of other outdoor units 5 to which the same group information is set.

Since the group information "1" is set to the outdoor unit 5a and the outdoor unit 5b in the present embodiment, the same group notifier 241 notifies the outdoor unit 5a of the first address of the outdoor unit 5b and notifies the outdoor unit 5b of the first address of the outdoor unit 5a.

Figure 7:
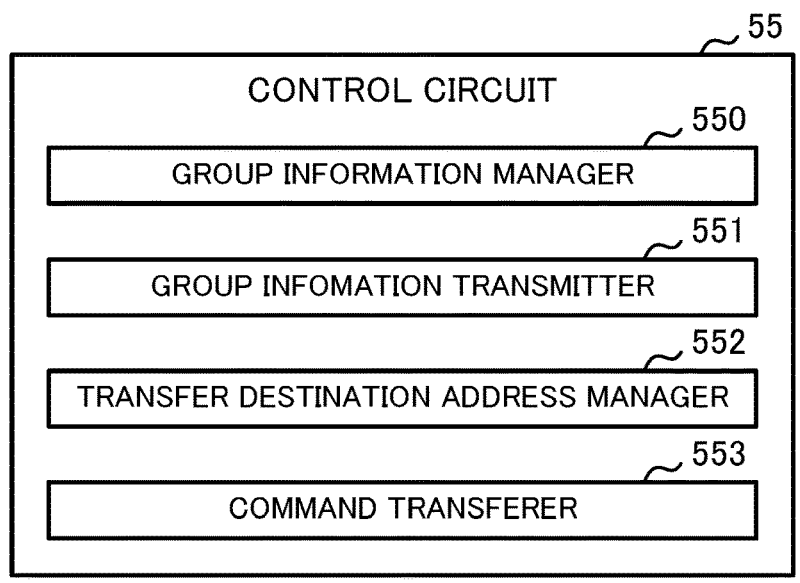
FIG. 7 is a diagram illustrating a functional configuration of the control circuit included in the outdoor unit of Embodiment 1.

Next, functions of the control circuit 55 included in the outdoor unit 5 are described in detail. The control circuit 55 functionally includes a group information manager 550, a group information transmitter 551, a transfer destination address manager 552, and a command transferer 553, as illustrated in FIG. 7. These functional components are achieved by the CPU of the control circuit 55 executing the above-mentioned group operation programs stored in the storage 54.

The group information manager 550 saves, in the storage 54, the group information set by the user via the setting switch 50, and manages the group information.

The group information transmitter 551 is an example of group information notification means according to the present disclosure. Upon receiving the above-mentioned query frame transmitted by the centralized management device 2, the group information transmitter 551 reads the group information saved in the storage 54 and transmits the read group information to the centralized management device 2. When a plurality of pieces of group information are saved in the storage 54, the group information transmitter 551 may transmit the plurality of pieces of group information together or transmit each piece of group information individually, to the centralized management device 2.

Upon receiving, from the centralized management device 2, notification of the first address of another outdoor unit 5 to which the same group information as the outdoor unit 5 is set, the transfer destination address manager 552 saves, as an address (hereinafter referred to as a transfer destination address) that is a transfer destination of the operation command, the notified first address in the storage 54, and manages the first address.

The command transferer 553 is an example of transfer means according to the present disclosure. When the destination of the operation command (an example of first operation command according to the present disclosure) received via the transmission line 8 from the remote controller 7 connected to the outdoor unit 5 is not included in the one or more indoor units 6 connected to the outdoor unit 5 (in other words, when the destination of the operation command is the indoor unit 6 in a refrigerant system different from that of the outdoor unit 5), the command transferer 553 transfers the operation command via the transmission line 4 to another outdoor unit 5 indicated by the transfer destination address saved in the storage 54.

Upon receiving, from another outdoor unit 5 indicated by the transfer destination address stored in the storage 54, via the transmission line 4 the operation command (an example of a second operation command according to the present disclosure) addressed to the indoor unit 6 connected to the outdoor unit 5, the command transferer 553 transfers via the transmission line 8 the operation command to the indoor unit 6 to which the operation command is addressed.

Figure 8:
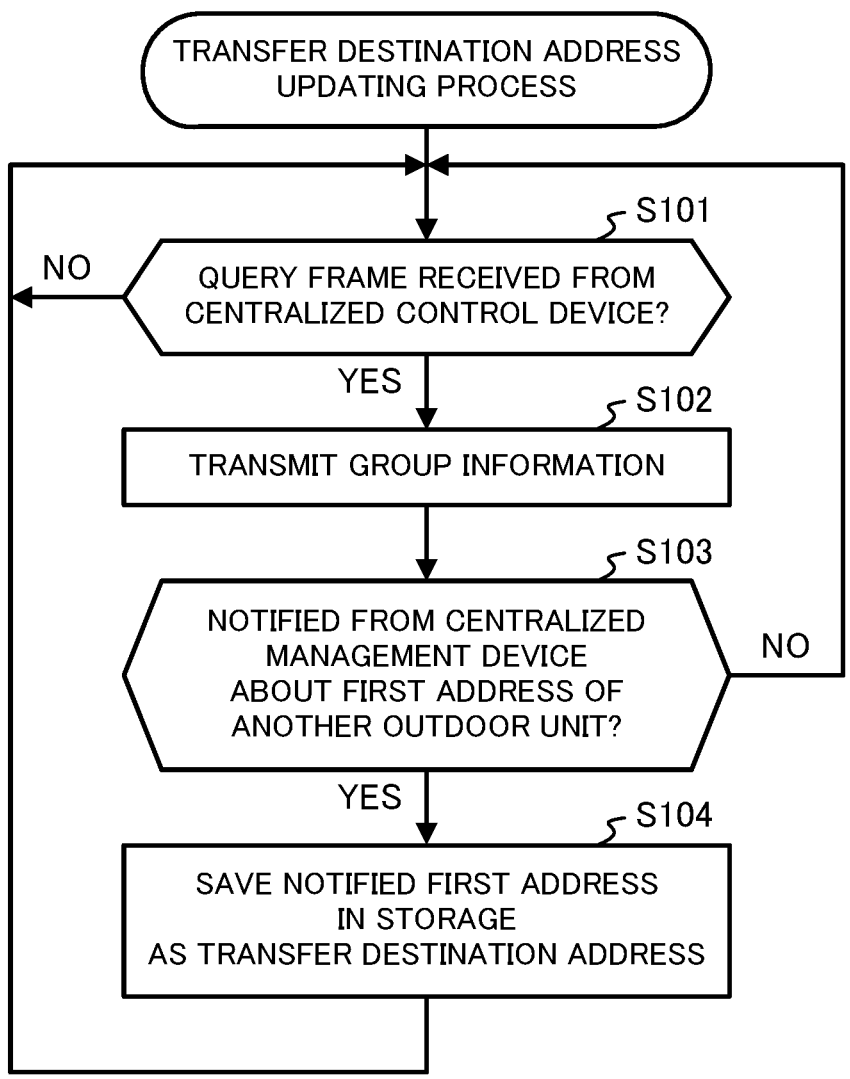
FIG. 8 is a flowchart illustrating steps of a transfer destination address updating process of Embodiment 1.

FIG. 8 is a flowchart of a transfer destination address updating process executed by the outdoor unit 5. Upon receiving the query frame transmitted by the centralized management device 2 (Yes in step S101), the outdoor unit 5 reads the group information saved in the storage 54 and transmits the read group information to the centralized management device 2 (step S102).

Then, upon receiving, from the centralized management device 2, notification of the first address of another outdoor unit 5 set to the same group information as that of the outdoor unit 5 (Yes in step S103), the outdoor unit 5 saves in the storage 54 the notified first address as the transfer destination address (step S104). Then the process for the outdoor unit 5 returns to step S101.

When the outdoor unit 5 does not receive, from the centralized management device 2, notification of the first address of another outdoor unit (No in step S103), the process of the outdoor unit 5 returns to step S101.

Figure 9:
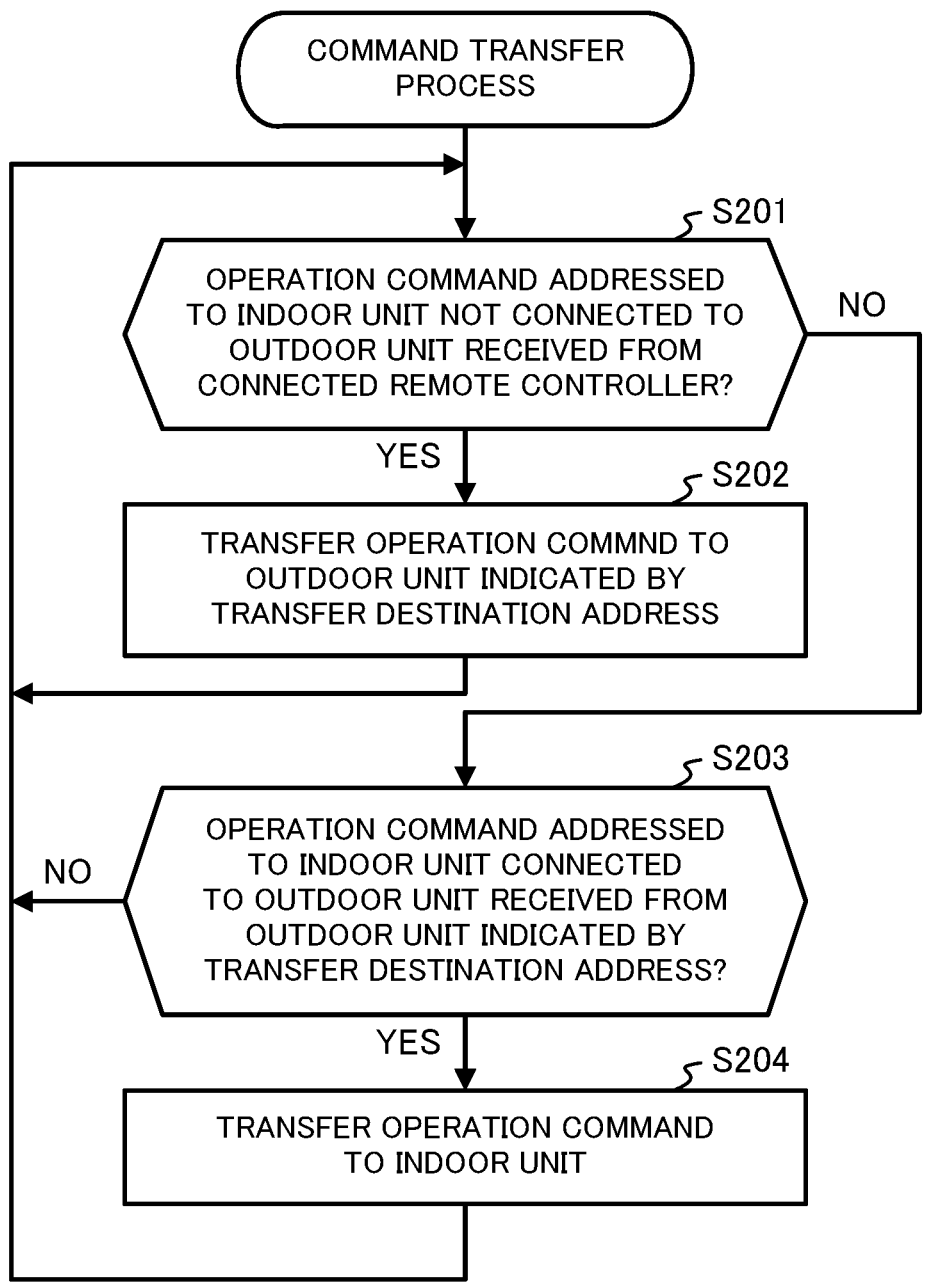
FIG. 9 is a flowchart illustrating steps of a command transfer process of Embodiment 1.

FIG. 9 is a flowchart of the command transfer process executed by the outdoor unit 5. Upon receiving, from the remote controller 7 connected to the outdoor unit 5, the operation command addressed to the indoor unit 6 not connected to the outdoor unit 5 (Yes in step S201), the outdoor unit 5 transfers the operation command to the outdoor unit 5 indicated by the transfer destination address saved in the storage 54 (step S202). Then the process for the outdoor unit 5 returns to step S201.

For example, when a user performs an operation to change setting temperature via the remote controller 7a, the remote controller 7a transmits, as a destination, the operation command relating to the operation to the indoor unit 6a and the indoor unit 6b belonging to the group 9a. Since the indoor unit 6b is an indoor unit (that is, the indoor unit in a different refrigerant system) not connected to the outdoor unit 5 (that is, the outdoor unit 5a), the outdoor unit 5a having received the operation command addressed to the indoor unit 6b transfers the operation command to another outdoor unit 5 (here, the outdoor unit 5b) indicated by the transfer address.

When the determination in step S201 is NO and the outdoor unit 5 receives, from another outdoor unit 5 indicated by the transfer destination address, the operation command addressed to the indoor unit 6 connected to the outdoor unit 5 (Yes in step S203), the outdoor unit 5 transfers the operation command to the indoor unit 6 (step S204).

For example, when the outdoor unit 5b receives, from the outdoor unit 5a, the operation command addressed to the indoor unit 6b connected to the outdoor unit 5 (here, the outdoor unit 5b), the outdoor unit 5b transfers the received operation command to the indoor unit 6b.

When the determination in step S203 is NO or after step S204, the process for the outdoor unit 5 returns to step S201.

As described above, since the integrated transmission line is a general-purpose local area network (LAN), the air-conditioning system 1 of Embodiment 1 has high scalability compared to the conventional air-conditioning system in which the integrated transmission line and the internal/external transmission line are configured in the same dedicated communication method.

The air-conditioning system 1 of Embodiment 1 can also achieve the group operation of the group to which the indoor unit 6 in a different refrigerant system belongs.

The group information transmitter 551 may read the group information saved in the storage 54 autonomously and transmit the read group information to the centralized management device 2. For example, the group information transmitter 551 may transmit to the centralized management device 2 the group information read from the storage 54 immediately after setting of the group information by the user, or may transmit to the centralized management device 2 the group information read from the storage 54 upon turning on of the outdoor unit 5.

The remote controller 7 connected to each outdoor unit 5 may receive setting of the group information from the user and transmit the group information, the setting of which is received, to the corresponding outdoor unit 5. In this case, the group information manager 550 of the outdoor unit 5 saves, in the storage 54, the group information received from the remote controller 7 and manages the group information. Alternatively, the centralized management device 2 may receive setting of the group information relating to each outdoor unit 5 from the user and transmit to each outdoor unit 5 each group information, the setting of which is received. In this case, the group information manager 550 of each outdoor unit 5 saves, in the storage 54, the group information received from the centralized management device 2 and manages the group information.

Embodiment 2

Next, Embodiment 2 of the present disclosure is described. In the following description, components and the like common to those of Embodiment 1 are assigned the same references and the description is omitted.

Figure 10:
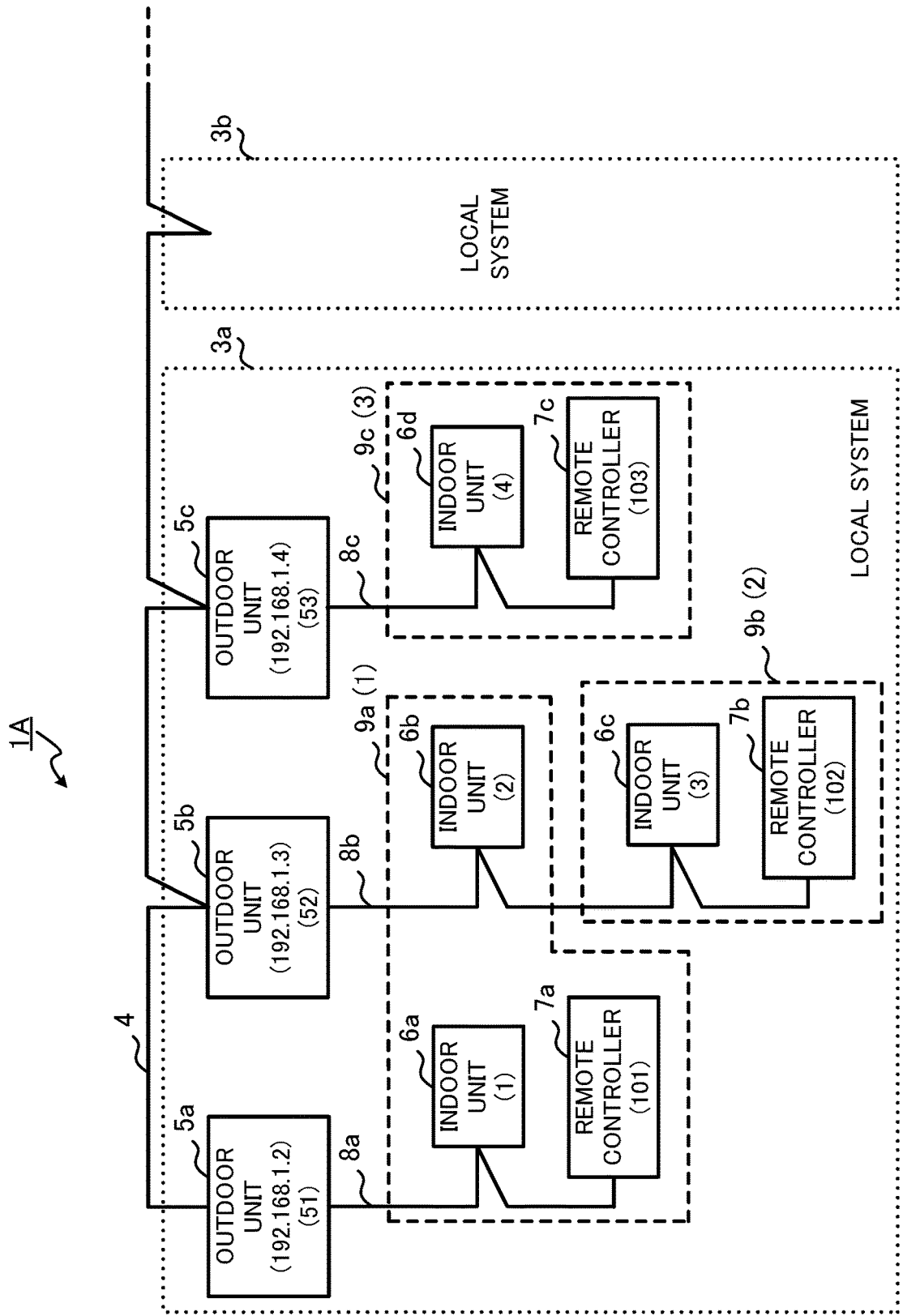
FIG. 10 is a diagram illustrating an overall configuration of an air-conditioning system according to Embodiment 2 of the present disclosure.

FIG. 10 is a diagram illustrating an overall configuration of an air-conditioning system 1A according to Embodiment 2 of the present disclosure. The configuration of the air-conditioning system 1A is similar to the configuration of the air-conditioning system 1 of Embodiment 1, with the exception of the centralized management device 2.

Figure 11:
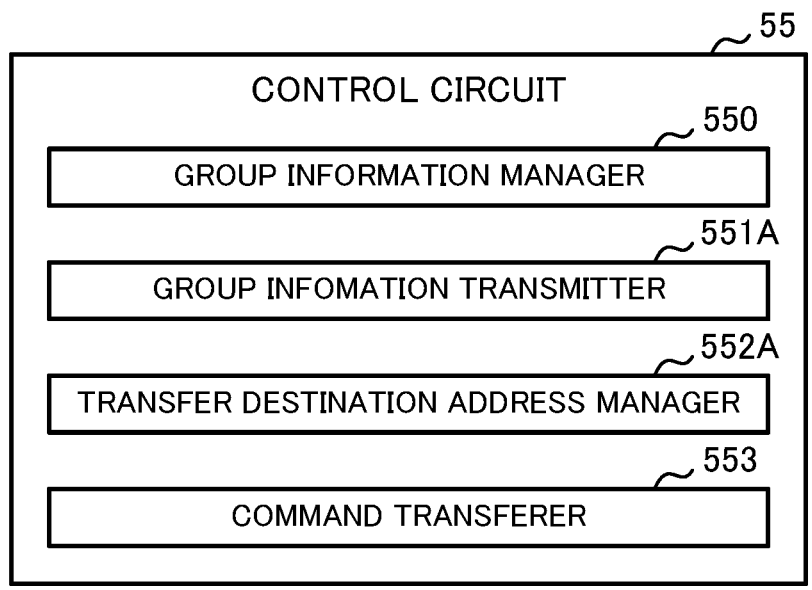
FIG. 11 is a diagram illustrating a functional configuration of a control circuit included in an outdoor unit of Embodiment 2.

However, functions of the outdoor unit 5 of Embodiment 2 differ from those of the outdoor unit 5 of Embodiment 1. As illustrated in FIG. 11, the control circuit 55 included in the outdoor unit 5 of Embodiment 2 includes the group information manager 550, a group information transmitter 551A, a transfer destination address manager 552A, and a command transferee 553. These functional components are achieved by execution of a group operation program that is a program relating to a group operation, stored in the storage 54 by the CPU of the control circuit 55 of Embodiment 2.

The group information transmitter 551A is an example of group information notification means according to the present disclosure. The group information transmitter 551A reads the group information saved in the storage 54 at a predetermined timing, and broadcasts the read group information to other outdoor units 5. For example, the group information transmitter 551A may broadcast, other outdoor units 5, the group information read from the storage 54 immediately after setting of the group information by the user or may broadcast, to other outdoor units 5, the group information read from the storage 54 upon turning on of the outdoor unit 5.

When a plurality of pieces of group information is saved in the storage 54, the group information transmitter 551A may broadcast the plurality of pieces of group information together, or broadcast each piece of group information individually, to the other outdoor units 5.

The transfer destination address manager 552A receives the group information broadcasted from each of the other outdoor units 5 and determines whether or not the received group information is identical to the group information to which the outdoor unit is set. When determination is made that the group information is identical to each other, the transfer destination address manager 552A saves, as a transfer destination address in the storage 54, the first address of the outdoor unit 5 that is a transmission source of the group information and manages the first address.

As described above, the air-conditioning system 1A of Embodiment 2 enables management of the transfer destination address of each outdoor unit 5 without depending on the centralized management device 2.

The remote controller 7 connected to each outdoor unit 5 may receive setting of the group information from the user and transmit the group information, the setting of which is received, to the corresponding outdoor unit 5. In this case, the group information manager 550 of the outdoor unit 5 saves in the storage 54 the group information received from the remote controller 7 and manages the group information.

The present disclosure is not limited to any of the above-described embodiments and various modifications are of course possible without departing from the gist of the present disclosure.

For example, when any group to which each indoor unit 6 connected to the outdoor unit 5 does not include the indoor unit 6 in another refrigerant system, setting of the group information with respect to the outdoor unit 5 can be omitted. For example, the group information may not be set with respect to the outdoor unit 5c.

In Embodiment 1, all or some of the functional components of the control circuit 24 of the centralized management device 2 (see FIG. 6) may be implemented by dedicated hardware, and all or some of the functional components of the control circuit 55 of the outdoor unit 5 of Embodiments 1 and 2 (see FIGS. 7 and 11) may be implemented by dedicated hardware. Examples of the dedicated hardware include, a single circuit, a composite circuit, a programmed processor, an application specific integrated circuit (ASIC), a field-programmable gate array (FPGA), or a combination thereof.

The group operation program of each of the above-described embodiments can be stored for distribution in a computer-readable recording medium, such as a compact disc read only memory (CD-ROM), a digital versatile disc (DVD), a magneto-optical disc (MO), a universal serial bus (USB) memory, a memory card, a HDD, or the like.

The group operation program of Embodiment 1 may be stored in a storage included in a non-illustrated server on the Internet to be downloaded from the server to the outdoor unit 5 of Embodiment 1.

The foregoing describes some example embodiments for explanatory purposes. Although the foregoing discussion has presented specific embodiments, persons skilled in the art will recognize that changes may be made in form and detail without departing from the broader spirit and scope of the invention. Accordingly, the specification and drawings are to be regarded in an illustrative rather than a restrictive sense. This detailed description, therefore, is not to be taken in a limiting sense, and the scope of the invention is defined only by the included claims, along with the full range of equivalents to which such claims are entitled.

INDUSTRIAL APPLICABILITY

The present disclosure can be preferably used in an air-conditioning system including indoor units.

The invention claimed is:

1. An outdoor unit, comprising:
a first communicator to communicate with a management device and one or more other outdoor units in a first communication method;
a second communicator to communicate with one or more indoor units and a remote controller in a second communication method different from the first communication method, the one or more indoor units and the remote controller being connected to the outdoor unit;
a first storage to store group information set by a user and uniquely assigned for each of one or more groups into which the one or more indoor units are grouped;
a group information notifier to notify the management device of the set group information;
a second storage to store address information relating to an address of another outdoor unit among the one or more other outdoor units to which the same group information as the outdoor unit is set, the address information being received from the management device; and
a transferer to transfer
    a first operation command received from the remote controller to the another outdoor unit when an indoor unit addressed in the first operation command is not included in the one or more indoor units, and
    a second operation command received from the another outdoor unit and addressed to an indoor unit of the one or more indoor units to the indoor unit.

2. An outdoor unit, comprising:
a first communicator to communicate with one or more other outdoor units in a first communication method;
a second communicator to communicate with one or more indoor units and a remote controller in a second communication method different from the first communication method, the one or more indoor units and the remote controller being connected to the outdoor unit;
a first storage to store group information set by a user and uniquely assigned for each of one or more groups into which the one or more indoor units are grouped;
a group information notifier to notify the one or more other outdoor units of the set group information;
a second storage to store address information relating to an address of another outdoor unit among the one or more other outdoor units to which the same group information as the outdoor unit is set; and
a transferer to transfer
    a first operation command received from the remote controller to the another outdoor unit when an indoor unit addressed in the first operation command is not included in the one or more indoor units, and
    a second operation command received from the another outdoor unit and addressed to an indoor unit of the one or more indoor units to the indoor unit.

3. The outdoor unit according to claim 1, further comprising a group information setting receiver to receive the setting of the group information from the user.

4. An air-conditioning system, comprising:
a management device; and
a plurality of the outdoor units according to claim 1.

5. A non-transitory computer-readable recording medium storing a program, the program causing a computer included in an outdoor unit to execute instructions comprising:
saving, in a storage, group information set by a user and uniquely assigned for each of one or more groups into which one or more indoor units connected to the outdoor unit are grouped;
notifying a management device of the set group information;
saving, in the storage, address information relating to an address of another outdoor unit among one or more other outdoor units to which the same group information as the outdoor unit is set, the address information being received from the management device;
when an indoor unit addressed in a first operation command received from a remote controller connected to the outdoor unit is not included in the one or more indoor units, transferring the first operation command to the another outdoor unit; and
transferring a second operation command received from the another outdoor unit and addressed to an indoor unit of the one or more indoor units to the indoor unit.

6. A non-transitory computer-readable recording medium storing a program, the program causing a computer included in an outdoor unit to execute instructions comprising:
saving, in a storage, group information set by a user and uniquely assigned for each of one or more groups into which one or more indoor units connected to the outdoor unit are grouped;
notifying one or more other outdoor units of the set group information;
saving, in the storage, address information relating to an address of another outdoor unit among the one or more other outdoor units to which the same group information as the outdoor unit is set;
when an indoor unit addressed in a first operation command received from a remote controller connected to the outdoor unit is not included in the one or more indoor units, transferring the first operation command to the another outdoor unit; and
transferring a second operation command received from the another outdoor unit and addressed to an indoor unit of the one or more indoor units to the indoor unit.

7. The outdoor unit according to claim 2, further comprising a group information setting receiver to receive the setting of the group information from the user.

* * * * *